Patented May 14, 1940

2,200,958

UNITED STATES PATENT OFFICE 2,200,958

GLASS FOR GASEOUS ELECTRIC DISCHARGE DEVICES

Hermann Krefft, Berlin-Friedrichshagen, Kurt Larché, Berlin, and Max Thomas, Weisswasser, Oberlausitz, Germany, assignors to General Electric Company, a corporation of New York No Drawing. Original application December 10, 1935, Serial No. 53,794. Divided and this application October 28, 1938, Serial No. 237,520. In Germany December 12, 1934

1 Claim. (Cl. 106—36.1)

The present invention relates to a glass for gaseous electric discharge devices generally and more particularly the invention relates to such devices the gaseous atmosphere of which consists of or comprises a metal vapor, such as mercury vapor.

In certain types of such devices the energy input and the heat dissipating characteristics of the container are in such relation that the container is at an elevated temperature and the mercury vapor is at an elevated pressure, such as atmospheric pressure during the operation of the device. One type of device of this kind is provided with thermionic electrodes and has a starting gas therein, such as argon, krypton, xenon, or neon. Such devices are efficient sources of visible light and emit in addition ultra-violet light which is useful in therapy, photochemistry, sterilization irradiation of foodstuffs or the like. When desired, a luminescent material, such as a fluorescent or a phosphorescent material, is associated with the device to transform the ultra-violet light into visible light which complements and supplements the visible light emitted by the discharge in the device.

Container glasses which are highly heat resisting, chemically inert with respect to the hot, ionized metal vapor and which transmit ultra-violet light are desirable for use in such devices. Such glasses are not readily attainable, however, and we have observed that glasses which have a high transmission characteristic for ultra-violet rays age rapidly when subjected to such rays of shorter wave length. Further these ultra-violet transmitting glasses have too low a softening temperature and are not inert to the hot mercury vapor and to other hot metal vapors which may be present in the lamp, such as caesium, cadmium, or zinc vapor. On the other hand glasses which are inert to such metal vapors and which have a high softening temperature do not transmit enough ultra-violet at the thicknesses required in lamp containers to make the lamp useful as an ultra-violet generator.

The object of the present invention is to provide a glass suitable for use as a container for a gaseous electric discharge device the gaseous atmosphere of which consists of or comprises a metal vapor which container is capable of withstanding an elevated temperature, has an inner surface which is inert with respect to the metal vapor and which transmits a large percentage of the ultra-violet rays emitted by the gaseous electric discharge in said device for a long useful operating life. Still further objects and advantages attaching to the device and to its use and operation will be apparent to those skilled in the art from the following particular description.

In accordance with this object of the invention the container comprises two layers of glass which are fused together and which are of different thickness. The inner layer is thinner than the outer layer and consists of a hard glass which has a high softening temperature, about 700° C. or higher, is inert with respect to the hot metal vapor in the lamp and which transmits the ultra-violet rays of the long and medium wave length but which does not transmit the ultra-violet rays of short wave length. The thicker outer layer of the container consists of a glass having a lower softening temperature, about 550 to 600° C., which is attacked by the hot metal vapor and which transmits a large percentage of the ultra-violet rays of long, medium and short wave length but which rapidly deteriorates under the influence of the ultra-violet rays of short wave length. A container of the above structure is useful in connection with gaseous electric discharge devices which operate with elevated container temperatures, such as a temperature of 500° C., and which emit ultra violet light.

A discharge device of this type is one having an elongated tubular container consisting of two glass layers the outer layer being greater in thickness than the inner layer. The container has two thermionic electrodes sealed therein, one at each end thereof, and a starting gas therein, such as argon, neon or krypton, or a mixture of such gases. Said container has a quantity of vaporizable metal therein, such as mercury, the vapor of which emits visible and ultra-violet light during the operation of the device. Preferably the quantity of metal is such that it is wholly vaporized at the operating temperature of the container. The electrodes consist of a metal filament, such as a tungsten filament, wrapped around a bar of electron emitting material, such as a sintered bar of barium, or strontium oxide, or a mixture of such oxides, and is electron emitting when heated. Said electrodes are heated to an electron emitting, discharge supporting temperature directly by the discharge incident thereat.

The inner glass layer of said container preferably consists of a glass having the following composition:

| | Per cent |
|---|---|
| Silica (SiO) | 58 |
| Boric oxide (B$_2$O$_3$) | 1 |
| Alumina (Al$_2$O$_3$) | 28 |
| Magnesium oxide (MgO) | 8 |
| Calcium oxide (CaO) | 5 |

A glass having the above composition has a softening temperature of about 720 to 740° C., transmits ultra-violet rays of the long and medium wave length (280 to 400 millimicrons) in thicknesses of from 0.1 to 0.5 mm. and is chemically inert with respect to the hot, ionized vapor of mercury, caesium, cadmium, or zinc. Initially such a glass transmits the ultra-violet rays of short wave length but rapidly loses its transmissibility for such rays.

When desired, a glass having the following composition is used as the inner layer:

| | Per cent |
|---|---|
| Silica (SiO$_2$) | 50 |
| Boric oxide (B$_2$O$_3$) | 1 |
| Alumina (Al$_2$O$_3$) | 25 |
| Magnesium oxide (MgO) | 8 |
| Calcium oxide (CaO) | 6 |
| Barium oxide (BaO) | 5 |
| Phosphorous pentoxide (P$_2$O$_5$) | 5 |

This glass has substantially the same characteristics as the glass given in the above example.

The outer glass layer preferably consists of a glass having the following composition:

| | Per cent |
|---|---|
| Silica (SiO$_2$) | 74 |
| Boric oxide (B$_2$O$_3$) | 15 |
| Sodium oxide (Na$_2$O) | 7 |
| Alumina (Al$_2$O$_3$) | 4 |

A glass having the above composition has a softening temperature of about 540 to 560° C. and transmits ultra-violet rays of long, medium, and short wave length at thicknesses in the order of 0.7 mm. or more.

When desired a glass having the following composition is used as the outer layer:

| | Per cent |
|---|---|
| Silica (SiO$_2$) | 75.5 |
| Boric oxide (B$_2$O$_3$) | 13.5 |
| Sodium oxide (Na$_2$O) | 9 |
| Alumina (Al$_2$O$_3$) | 2 |

This glass has substantially the same characteristics as the glass disclosed above for use as the external layer.

Due to the fact that the inner glass layer does not transmit the ultra-violet rays of short wave length after the device has been operating for a short time the glass of the outer layer does not age rapidly and remains pervious to the long and medium ultra-violet rays generated by the discharge and transmitted by the inner layer for a long time. The outer layer does not become brown or black since it is protected from the deleterious chemical effects of the hot, ionized metal vapor by the inner layer.

The gaseous electric discharge device is useful as an ultra-violet generator and the ultra-violet light emitted thereby is useful for many purposes as pointed out above. When desired, a luminescent material is associated with the device which transforms the ultra-violet light into visible light to complement and supplement the spectrum of the visible light emitted by the device. Such luminescent materials as calcium tungstate, or zinc silicate are useful for this purpose.

When desired, the container is mounted in an evacuated, sealed envelope which reduces the heat losses therefrom to increase the efficiency of the device. The luminescent material is applied to, or incorporated in said envelope, when desired.

This application is a division of our co-pending application Serial Number 53,794, filed December 10, 1935.

What we claim as new and desire to secure by Letters Patent of the United States is:

A glass having the following composition:

| | Per cent |
|---|---|
| Silica (SiO$_2$) | 50 |
| Boric oxide (B$_2$O$_3$) | 1 |
| Alumina (Al$_2$O$_3$) | 25 |
| Magnesium oxide (MgO) | 8 |
| Calcium oxide (CaO) | 6 |
| Barium oxide (BaO) | 5 |
| Phosphorous pentoxide (P$_2$O$_5$) | 5 |

HERMANN KREFFT.
KURT LARCHÉ.
MAX THOMAS.